United States Patent
Li et al.

(10) Patent No.: US 8,984,213 B2
(45) Date of Patent: Mar. 17, 2015

(54) ELECTRONIC SYSTEM AND MEMORY MANAGING METHOD THEREOF

(71) Applicant: MStar Semiconductor, Inc., Hsinchu County (TW)

(72) Inventors: Chien-Hsiang Li, Taipei (TW); Tse-Wei Wang, Taipei (TW)

(73) Assignee: MStar Semiconductor, Inc., Hsinchu County (TW)

( * ) Notice: Subject to any disclaimer, the term of this patent is extended or adjusted under 35 U.S.C. 154(b) by 141 days.

(21) Appl. No.: 13/682,989

(22) Filed: Nov. 21, 2012

(65) Prior Publication Data
US 2013/0132651 A1    May 23, 2013

(30) Foreign Application Priority Data

Nov. 21, 2011  (TW) .............................. 100142612 A

(51) Int. Cl.
*G06F 12/00* (2006.01)
*G06F 12/02* (2006.01)

(52) U.S. Cl.
CPC .................................. *G06F 12/0246* (2013.01)
USPC ......................................................... 711/103

(58) Field of Classification Search
CPC ............. G06F 12/0246; G06F 3/0679; G06F 2212/2022; G06F 2212/7211; G06F 12/0238; G06F 2212/222; G11C 16/102
USPC ......................................................... 711/103
See application file for complete search history.

(56) References Cited

U.S. PATENT DOCUMENTS

2010/0274951 A1* 10/2010 Fang et al. ..................... 711/103
2011/0280074 A1* 11/2011 Lin ........................... 365/185.11

FOREIGN PATENT DOCUMENTS

TW         201007451 A     2/2010

OTHER PUBLICATIONS

Taiwan Intellectual Property Office, "Office Action", May 9, 2014

* cited by examiner

*Primary Examiner* — Jasmine Song
(74) *Attorney, Agent, or Firm* — WPAT, PC; Justin King

(57) ABSTRACT

A method for managing a flash memory including a plurality of blocks is provided. Each block includes a plurality of sets of a first page and a second page configured in pair. In response to a request for writing target data into a target block, at least one cache block is selected from the blocks. The target data is then written into the first pages in the at least one cache block. When a write-back condition is established, the target data is written from the cache block back to the target block.

17 Claims, 4 Drawing Sheets

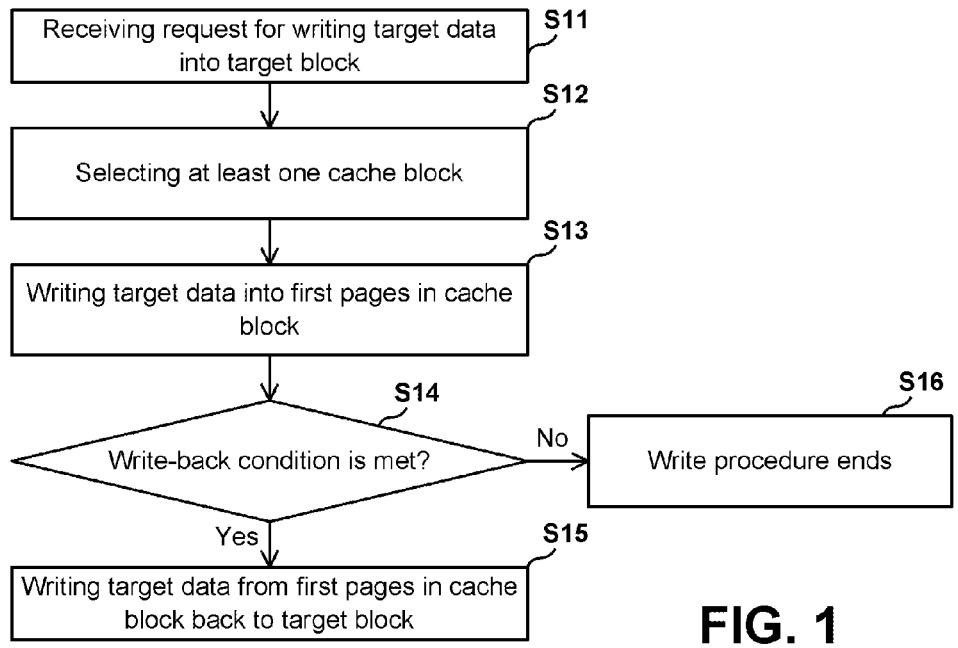

FIG. 1

| cache block B1 | | | |
|---|---|---|---|
| page number | type | state | sequence number |
| 0 | LSB | data stored | 0 |
| 1 | LSB | data stored | 2 |
| 2 | LSB | data stored | 4 |
| 3 | LSB | data stored | 6 |
| 4 | MSB | - | - |
| 5 | MSB | - | - |
| 6 | LSB | data stored | 8 |
| 7 | LSB | data stored | 10 |
| 8 | MSB | - | - |
| 9 | MSB | - | - |
| 10 | LSB | data stored | 12 |
| ⋮ | ⋮ | ⋮ | ⋮ |

| cache block B2 | | | |
|---|---|---|---|
| page number | type | state | sequence number |
| 0 | LSB | data stored | 1 |
| 1 | LSB | data stored | 3 |
| 2 | LSB | data stored | 5 |
| 3 | LSB | data stored | 7 |
| 4 | MSB | - | - |
| 5 | MSB | - | - |
| 6 | LSB | data stored | 9 |
| 7 | LSB | data stored | 11 |
| 8 | MSB | - | - |
| 9 | MSB | - | - |
| 10 | LSB | data being stored | 13 |
| ⋮ | ⋮ | ⋮ | ⋮ |

FIG. 2

ELECTRONIC SYSTEM AND MEMORY MANAGING METHOD THEREOF

This application claims the benefit of Taiwan application Serial No. 100142612, filed Nov. 21, 2011, the subject matter of which is incorporated herein by reference.

BACKGROUND OF THE INVENTION

1. Field of the Invention

The invention relates in general to a flash memory, and more particularly, to a method for managing a multi-level cell (MLC) flash memory.

2. Description of the Related Art

Different from a single-level cell (SLC) flash memory, an MLC flash memory is capable of storing at least two information bits in each storage unit. The term "multi-level" as used here means that each storage unit has more than two voltage values. Although the MLC flash memory is compromised by drawbacks of having shorter lifespan, higher power consumption, and a slower access speed, the MLC is still prevalent in various kinds of storage device because it has a greater capacity per unit cost than that of the SLC flash memory.

The MLC flash memory generally includes several blocks, each of which includes multiple sets of paired pages. Taking a page containing 32 pages as an example, the block possibly contains 16 most significant bit (MSB) pages and 16 least significant bit (LSB) pages. Each MSB page pairs with one LSB page to form a set of storage unit. One of the most critical drawbacks of the MLC flash memory is that, when an unexpected power-off or reset takes place while data are being written into a MSB page, not only data in the MSB page currently being written but also data originally stored in the paired LSB page corresponding to the MSB page are damaged, and vice versa.

Certain solutions for preventing or remedying the above error are available. In one conventional solution, an upper file system restores a file that is not completely written according to a system log. In another conventional solution, a writable region is limited within a single-type page (e.g., only the MSB page or the LSB page) between the paired pages—such approach suffers from a shortcoming of significantly reduced available capacity of a memory. In yet another conventional solution, data originally stored in a paired page B of a page A is duplicated to a backup region when writing data into the page A. Thus, when an error occurs in the write process, the system simply restores the data back to the page B from the backup region.

SUMMARY OF THE INVENTION

The invention is directed to a method for managing a multi-level unit (MLC) flash memory. In a write procedure, data are first stored in a predetermined type of pages in a cache block to prevent mutual damaging of paired pages. When a write-back condition is met, a set of target data is officially written to a target block. In the occurrence of an unusual situation during the process of writing the set of target data into the target block, the data in the cache block may be utilized to assist in restoring the target block.

According to one embodiment the present disclosure, a method for managing an MLC flash memory including a plurality of blocks is provided. Each block includes a plurality of sets of a first page and a second page configured in pair. In response to a request for writing a set of target data into a target block, at least one cache block is selected from the plurality of blocks. The set of target data is then written into the first pages of the at least one cache block. When a write-back condition is met, the set of target data is written from the cache block to the target block.

According to another embodiment of the disclosure, an electronic system is provided. The electronic system includes an MLC flash memory and a controller. The MCL includes a plurality of blocks, each block of which includes a plurality of sets of a first page and a second page configured in pair. In response to a request for writing a set of target data into a target block, the controller selects at least one cache block from the plurality of blocks, and the writes the set of target data into the first pages of the at least one cache block. When a write-back condition is met, the controller writes the set of target data from the cache block to the target block.

According to yet another embodiment of the disclosure, a computer-readable storage medium is provided. The computer-readable storage medium stores a code readable and executable by a processor. The code is for managing an MLC flash memory. The MLC memory includes a plurality of blocks, each of which includes plurality of sets of a first page and a second page configured in pair. In response to a request for writing a set of target data into a target block, a first code selects at least one cache block from the plurality of blocks. A second code writes the set of target data into the first pages of the at least cache block. When a write-back condition is met, a third code writes the set of target data from the first pages of the at least one cache to the target block.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1 is a flowchart of a method for managing a memory according to an embodiment of the disclosure.

FIG. 2 is a schematic diagram showing content of a cache block according to one embodiment of the disclosure.

DETAILED DESCRIPTION OF THE INVENTION

Figure 3:
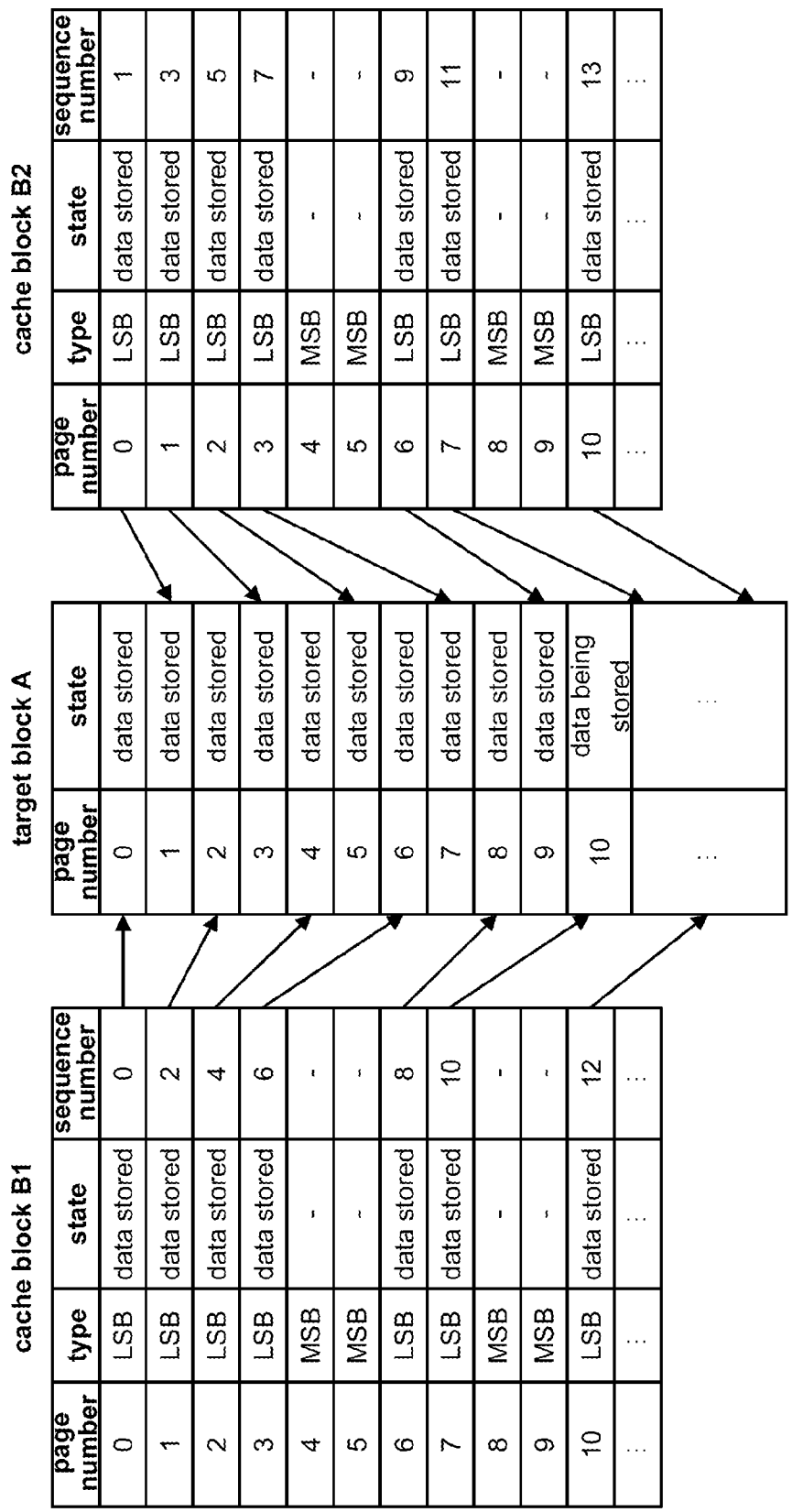
FIG. 3 is a schematic diagram depicting relations among pages of a target block and cache blocks according to one embodiment of the disclosure.

A method for managing a flash memory, e.g., a multi-level cell (MLC) flash memory, is provided according to one embodiment of the disclosure. FIG. 1 shows a flowchart of the method. In practice, the MLC flash memory may be directly built-in an electronic system, or may be in a form of a memory card or a portable disk connecting to an electronic system via versatile converting devices. For example, the electronic system may be a digital video camera, a mobile communication device, a portable computer, a desktop computer, or an external storage device capable of communicating with the MLC flash memory.

In this embodiment, the MLC flash memory includes a plurality of blocks, each of which includes a plurality of sets of a first page and a second page configured in pair. For example, the first page may be a most significant bit (MSB) page, and the second page is correspondingly a least significant bit (LSB) page. Alternatively, the first page may be an LSB page and the second page may correspondingly be an MSB page. In a triple-level cell (TLC) flash memory, the first page and the second page may be any two pages among three pages of a same set. In the following descriptions, an example of the first page being an LSB page and the second page being an MSB page is given.

Referring to FIG. 1, in Step S11, a request for writing target data into a target block is received. In response to the request, Step S12 is performed to select at least one cache block from the blocks of the MLC flash memory. For example, the MLC flash memory may be designed to reserve a predetermine number (e.g., 20) of blocks serving as cache blocks. If the request received in Step S11 is for writing target data into a target block A of the MLC flash memory, Step S12 is performed to select two unused cache blocks B1 and B2 from the 20 cache blocks, corresponding to the target block A.

In Step S13, the target data intended for the target block A are first written into the cache blocks B1 and B2 instead of being directly written into the target block A. FIG. 2 is a schematic diagram of the cache blocks B1 and B2. In this embodiment, the target data are stored in the LSB pages in the cache blocks B1 and B2. In other words, the MSB pages in the cache blocks B1 and B2 are not utilized. Taking a situation that the target block A and the cache blocks B1 and B2 respectively including 16 LSB pages and 16 MSB pages as an example, the target data is only stored in the 16 LSB pages in the cache block B1 and the 16 LSB pages in the cache block B2.

Assume that the size of the target data intended for the target block A in the embodiment in FIG. 2 occupy 14 pages. It should be noted that, the target data are sequentially written into the LSB pages of the cache blocks B1 and B2, with a column with sequence number indicating a write sequence. In this embodiment, the first page of the target data is stored into a page bearing a page number 0 in the cache block B1, the second page of the target data is stored into a page bearing a page number 0 in the cache block B2, and the third page of the target data is stored in a page bearing a page number 1 in the cache block B1. In FIG. 2, the first 13 pages of the target data are stored, and the $14^{th}$ page is being stored into a page bearing a page number 10 in the cache block B2.

As shown in FIG. 2, the target data are distributed in the LSB pages in the cache blocks B1 and B2. Since the MSB pages in the cache blocks B1 and B2 are not used, a storage approach of the cache blocks B1 and B2 are substantially the same as that of the SLC flash memory, and is thus free from mutual damaging of the paired pages.

In Step S14, it is determined whether a write-back condition is met. In one embodiment, the write-back condition is met when a normal shut-down occurs. A normal shut-down refers to a situation that the electronic system implementing the MLC flash memory enters a shut-down state according to a normal procedure. When a determination result in Step S14 is negative, Step S16 is performed to end the current write procedure. Conversely, when the determination result in Step S14 is affirmative, Step S15 is performed to write the target data from the LSB pages in the cache blocks B1 and B2 back to the target block A. In practice, when the normal shut-down is in progress, the data stored in the above 20 blocks can be respectively written back to the corresponding target block.

FIG. 3 shows a schematic diagram depicting relations among the pages in the target block A and those in the cache blocks B1 and B2. In this embodiment, when the determination result in Step S14 is affirmative, the target data stored in the 14 pages LSB pages in the cache blocks B1 and B2 are respectively written back to the pages numbered 0 to 13 in the target block according to the sequence number. It should be noted that, the writable region in the target block A for storing the target data is not limited to a specific type of pages. That is to say, both the LSB pages and the MSB pages in the target block A may be utilized for storing data. Further, when writing the data back to the target block A, backup data for restoring original data is still present in the cache blocks B1 and B2, and so mutual damaging of the paired pages is eliminated.

In another embodiment, the write-back condition is met when a capacity of a cache block saturates. For example, assuming the size of the target data intended for the target block A occupies a total of 32 pages, i.e., the target data occupies all the LSB pages in the cache blocks B1 and B2. After having written the target data into the cache blocks B1 and B2, it is determined that the capacity of the cache blocks B1 and B2 has reached saturation. When the capacity of the cache blocks B1 and B2 has reached saturation, the write-back condition is met and Step S15 is performed to write the target data stored in the LSB pages in the cache blocks B1 and B2 back to the pages numbered 0 to 31 in the target block A.

In practice, before reaching capacity saturation of the cache blocks B1 and B2, the target data intended for the target block A are temporarily stored in the cache blocks B1 and B2. Each cache block currently being used is marked to indicate to which block in the MLC flash memory that the cache block corresponds. After writing the data target back to the target block A, the cache blocks B1 and B2 are cleared to again become cache blocks that are not in use.

In another embodiment, the write-back condition includes an insufficient number of cache blocks. For example, assume the foregoing 20 cache blocks are all marked as in use. When a request for writing data into the MLC flash memory arises, data in one or more cache blocks in the 20 cache blocks are written back to the corresponding block, so as to vacate cache blocks for storing new data.

Figure 4:
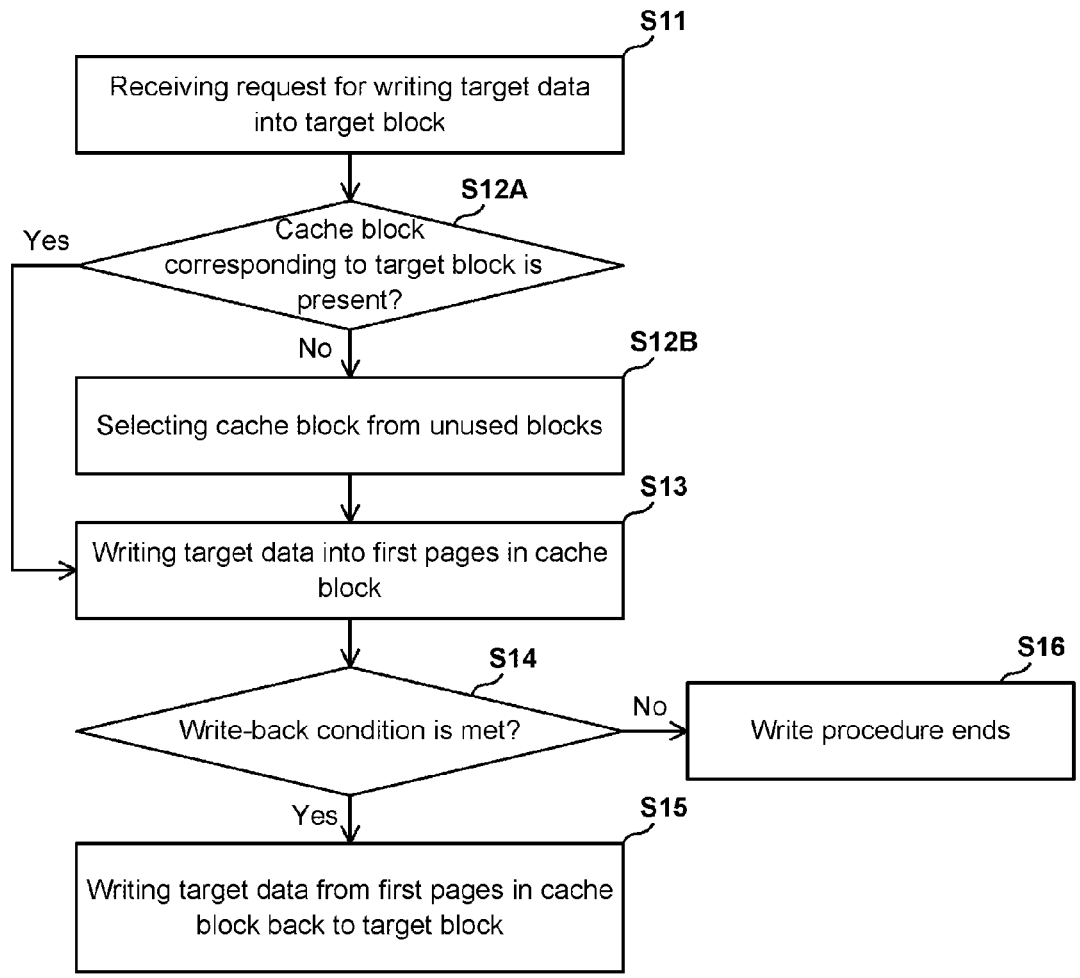
FIGS. 4 and 5 are flowcharts of a method for managing a memory according to an embodiment of the disclosure.

FIG. 4 shows a flowchart of a managing method according to another embodiment of the disclosure. In the method according to this embodiment, the method further includes Step S12A. In Step S12A, it is determined whether at least one cache block in the flash memory is assigned to be corresponding to the target block before Step S12. When a determination result in Step S12A is negative, at least one cache block is selected from unused blocks for the target block in Step S12B. Conversely, when the determination result in Step S12A is affirmative, the target data are directly written into the at least one cache block corresponding to the target block in Step S13. For example, if cache blocks B1 and B2 among the foregoing 20 cache blocks are already assigned to be corresponding to target block A, the cache blocks B1 and B2 can be directly used instead of additionally assigning another cache block to the target block.

Figure 5:
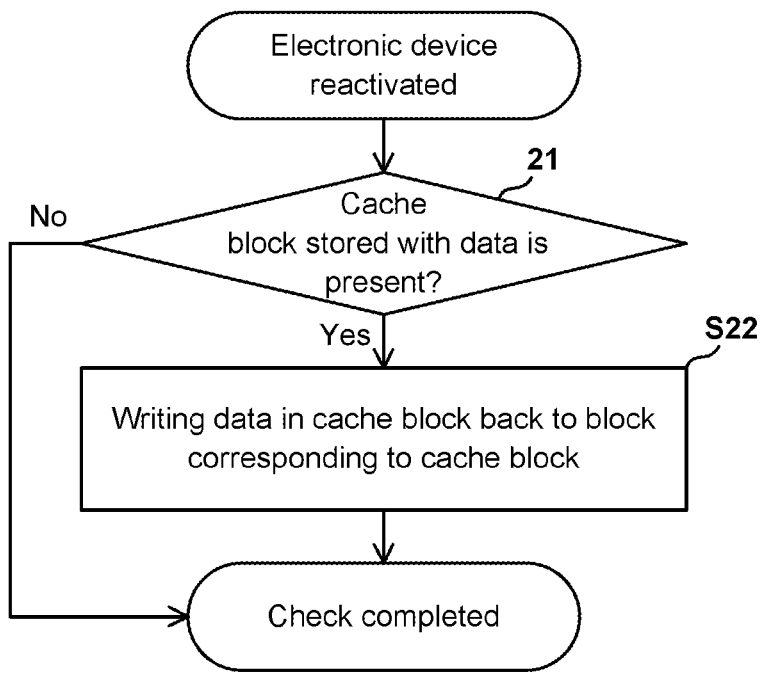

FIG. 5 shows a flowchart of a managing method according to yet another embodiment of the disclosure. This process is implemented jointly with the method described in FIG. 4 or FIG. 1. As previously described, the data in the cache blocks are supposedly written back to respective blocks when an electronic device enters a shut-down state under normal operation. Thus, after an electronic device operating jointly with the flash memory is reactivated, Step S21 is performed to determine whether a cache block stored with data is present in the flash memory. When a determination result in Step S21 is affirmative, an abnormal shut-down may have occurred, and Step S22 is performed. In Step S22, the data in the cache block is written back to the block corresponding to the cache block to restore the data that is possibly not correctly written thereto earlier.

Figure 6:
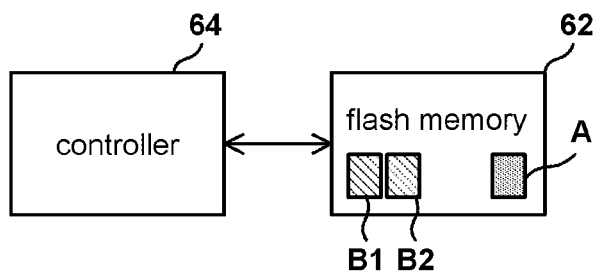
FIG. 6 is a block diagram of an electronic device according to one embodiment of the disclosure.

According to another embodiment of the disclosure, an electronic device is provided. Referring to FIG. 6, the electronic device includes a flash memory 62, e.g., an MLC flash memory, and a controller 64. The flash memory 62 includes a plurality of blocks, each of which includes a plurality of sets of a first page and a second page configured in pair. In response to a request for writing target data into a target block A, the controller 64 selects at least one cache block (B1 and B2) from the blocks, and writes the target data into the first pages (e.g., LSB pages) in the at least one cache block (B1 and B2). When a write-back condition is established, the controller 64 writes the target data from the first pages in the at least one cache block (B1 and B2) back to the target block A.

Operation details of the controller 64 can be referred to in the description of the foregoing managing methods and shall be omitted herein. In one embodiment, the controller 64 further includes a determining module for performing Step S12A and a selecting module for performing Step S12. In one embodiment, the controller 64 further includes another determining module for performing Step S21 and a restoring module for performing Step S22.

According to yet another embodiment of the disclosure, a computer-readable storage medium is provided. The computer-readable storage medium stores a code that is readable and executable by a processor. For example, the code is installed in memory management firmware of an electronic device. The code is for managing a flash memory. When the code is loaded and executed by the processor, the processes in FIG. 1, 4, or 5 may be achieved.

Therefore, the disclosure provides a novel method for managing a flash memory. During a write procedure, data are stored in a predetermined type of pages in a cache block to prevent mutual damaging of the paired pages. The target data is only officially written into a target block when a write-back condition is established. In the event of an abnormal situation during the process of writing the target data into the target block, the data in the cache block may be utilized to assist in restoring the target block.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for managing a flash memory, the flash memory comprising a plurality of blocks, each block comprising a plurality of sets of a first page and a second page configured in pair, the method comprising:
    selecting at least one cache block from the plurality of blocks;
    writing a set of target data into the first pages of the at least one cache block;
    when a write-back condition is met, writing the set of target data from the first pages of the at least one cache block to a target block;
    determining whether at least one cache block corresponding to the target block is in the flash memory prior to selecting at least one cache block from the plurality of blocks;
    selecting the at least one cache block in the step of selecting at least one cache block from the plurality of blocks when a determination result of the step of determining whether at least one cache block corresponding to the target block is in the flash memory is affirmative; and
    selecting at least one cache block from unused blocks for the target block in the step of selecting at least one cache block from the plurality of blocks when the determination result of the step of determining whether at least one cache block corresponding to the target block is in the flash memory is negative.

2. The method according to claim 1, wherein the flash memory is a multi-level cell (MLC) flash memory, the first page is a most significant bit (MSB) page or a least significant bit (LSB) page, and the second page is one other type of page relative to the first page.

3. The method according to claim 1, wherein the flash memory is a triple-level cell (TLC) flash memory, and the first page and the second page are a paired set comprising any two pages among three pages.

4. The method according to claim 1, wherein the step of selecting at least one cache block from the plurality of blocks comprises selecting two cache blocks corresponding to the target block from the plurality of blocks.

5. The method according to claim 1, wherein the write-back condition comprises a normal shut-down, an insufficient number of cache blocks and a cache block capacity saturation.

6. The method according to claim 1, further comprising:
    after an electronic device operating jointly with the flash memory is reactivated, determining whether a cache block stored with data is in the flash memory; and
    writing data stored in the cache block to a block corresponding to the cache block when a determination result in the step of determining whether a cache block stored with data is in the flash memory is affirmative.

7. An electronic device, comprising:
    a flash memory, comprising a plurality of blocks, each block comprising a plurality of sets of a first page and a second page configured in pair; and
    a controller, coupled to the flash memory, for selecting at least one cache block from the plurality of blocks, writing a set of target data into the first pages of the at least one cache block, and writing the set of target data from the first pages of the at least one cache block to a target block when a write-back condition occurs;
    wherein said controller comprises:
    a first determining module, for determining whether at least one cache block corresponding to the target block is in the flash memory; and
    a selecting module, for selecting the at least cache block when a determination result of the first determining module is affirmative, and selecting at least one cache block from unused blocks for the target block when the determination result of the first determining module is negative.

8. The electronic device according to claim 7, wherein the flash memory is an MLC flash memory, the first page is an MSB page or an LSB page, and the second page is one other type of page relative to the first page.

9. The electronic device according to claim 7, wherein the flash memory is a TLC flash memory, and the first page and the second page are a paired set comprising any two pages among three pages.

10. The electronic device according to claim 7, wherein the controller selects two cache blocks corresponding to the target block from the blocks in response to the request for writing the target data into the target block.

11. The electronic device according to claim 7, wherein the write-back condition comprises a normal shut-down, an insufficient number of cache blocks or a cache block capacity saturation.

12. The electronic device according to claim 7, wherein the controller comprises:

a second determining module, for determining whether a cache block stored with data is in the flash memory after an electronic device operating jointly with the flash memory is reactivated; and a restoring module, for writing data stored in the cache block to a block corresponding to the cache block when a determination result of the second determination module is affirmative.

13. A non-transitory computer-readable storage medium, storing a code readable and executable by a processor, for managing a flash memory comprising a plurality of blocks, each block comprising a plurality of sets of a first page and a second page configured in pair, the code comprising:

a first code, for selecting at least one cache block from the plurality of blocks;

a second code, for writing a set of target data into the first pages of the at least one cache block; and a third code, for writing the set of target data from the first pages of the at least one cache block to a target block when a write-back condition occurs;

a first sub-code, for determining whether at least one cache block corresponding to the target block is in the flash memory to generate a first determination result; wherein, the first sub-code comprises:

a second sub-code, for selecting the present at least cache block when the first determination result is affirmative; and a third sub-code, for selecting at least one cache block from unused blocks for the target block when the first determination result is negative.

14. The non-transitory computer-readable storage medium according to claim 13, wherein the flash memory is a TLC flash memory, and the first page and the second page are a paired set comprising any two pages among three pages.

15. The non-transitory computer-readable storage medium according to claim 13, wherein the first code selects two cache blocks corresponding to the target block from the blocks when being executed.

16. The non-transitory computer-readable storage medium according to claim 13, wherein the write-back condition comprises a normal shut-down, an insufficient number of cache blocks or a cache block capacity saturation.

17. The non-transitory computer-readable storage medium according to claim 13, further comprising:

a fourth code, for determining whether a cache block stored with data is in the flash memory after an electronic device operating jointly with the flash memory is reactivated to generate a second determination result; and a fifth code, for writing data stored in the cache block to a block corresponding to the cache block when the second determination result is affirmative.

* * * * *